US012578260B2

(12) United States Patent
Vijayvargiya et al.

(10) Patent No.: US 12,578,260 B2
(45) Date of Patent: Mar. 17, 2026

(54) EXPOSED METAL LOOP TO DETECT CORROSION IN A DATA STORAGE DEVICE

(71) Applicant: Sandisk Technologies, Inc., Milpitas, CA (US)

(72) Inventors: Amit Vijayvargiya, Bengaluru (IN); Subha Sekhar, Bengaluru (IN); Anoop Thomas, Bengaluru (IN)

(73) Assignee: Sandisk Technologies, Inc., Milpitas, CA (US)

( * ) Notice: Subject to any disclaimer, the term of this patent is extended or adjusted under 35 U.S.C. 154(b) by 141 days.

(21) Appl. No.: 18/449,299

(22) Filed: Aug. 14, 2023

(65) Prior Publication Data

US 2025/0060303 A1 Feb. 20, 2025

(51) Int. Cl.
  *G01N 17/04* (2006.01)
  *G01N 17/00* (2006.01)
(52) U.S. Cl.
  CPC ........... *G01N 17/04* (2013.01); *G01N 17/006* (2013.01)

(58) Field of Classification Search
  CPC ..... G01N 17/04; G01N 17/043; G01N 17/046
  See application file for complete search history.

(56) References Cited

U.S. PATENT DOCUMENTS

| | | | | |
|---|---|---|---|---|
| 11,965,818 | B1 * | 4/2024 | Moore | G01N 17/006 |
| 2018/0284011 | A1 * | 10/2018 | Farkas | G01R 17/02 |
| 2019/0224511 | A1 * | 7/2019 | Cogswell | A62C 35/68 |
| 2022/0026870 | A1 * | 1/2022 | Embleton | G06F 1/206 |

* cited by examiner

*Primary Examiner* — Noam Reisner
(74) *Attorney, Agent, or Firm* — DENTONS Durham Jones Pinegar

(57) ABSTRACT

A corrosion detection system for a data storage device includes an exposed metal loop provided on a PCB of the data storage device. The corrosion detection system periodically measures an inductance of the exposed metal loop and compares the measured inductance to a reference inductance. If a difference between the measured inductance and the reference inductance exceeds a threshold, the corrosion detection system determines the data storage device is exposed to a corrosion risk and notifies a host device.

20 Claims, 5 Drawing Sheets

400

200

210

220

220

220

400

410
MEASURE INDUCTANCE OF
EXPOSED METAL LOOP

420
COMPARE INDUCTANCE
MEASUREMENT TO REFERENCE
INDUCTANCE MEASUREMENT

430
IS
DIFFERENCE
ABOVE A
THRESHOLD?

460
GENERATE
NOTIFICATION

440
INITIATE TIMING SYSTEM

470
PROVIDE NOTIFICATION
TO HOST DEVICE

450
STORE MEASURED
INDUCTANCE

EXPOSED METAL LOOP TO DETECT CORROSION IN A DATA STORAGE DEVICE

BACKGROUND

Computing devices, such as data storage devices, include a printed circuit board (PCB) and a number of computing components mounted on a surface of the PCB. For example, a data storage device typically includes various integrated circuits, memory dies and passive components mounted on the PCB. The PCB also includes a number of exposed copper traces that electrically couple the various computing components that are mounted on the PCB.

Some computing devices also include a mechanical enclosure that encases the PCB, the various computing components and the exposed copper traces. Due to the amount of heat generated by the various computing components, the mechanical enclosure includes air inlets that enable external air to enter the mechanical enclosure and cool the various computing components.

However, the air that enters the mechanical enclosure may include moisture or other contaminants. Over time, the moisture and/or the contaminants may cause the copper traces to corrode. As the copper traces corrode, the risk of electrical discontinuities or shorts increases, which may cause the computing device to malfunction or fail. Because the copper traces and the other computing components are encased by the mechanical enclosure, it difficult, if not impossible, to perform a visual inspection and detect the corrosion.

Accordingly, it would be beneficial for a computing device to include a corrosion detection system that determines whether the computing device is exposed to a corrosion risk and provides a corrosion risk notification to a host device.

SUMMARY

The present application describes a corrosion detection system for a data storage device. Although a data storage device is specifically mentioned, the corrosion detection system may be used to monitor corrosion risks for a variety of electronic device and/or computing devices. In an example, the corrosion detection system includes an exposed metal loop provided on a surface of a printed circuit board (PCB) of the data storage device. For example, the exposed metal loop is provided on a distal end of the PCB and/or proximate an airflow inlet of a mechanical enclosure that encases the various computing components of the data storage device.

The corrosion detection system periodically monitors or measures the inductance of the exposed metal loop and compares the measured inductance to a reference inductance or an initial inductance (e.g., the inductance of the exposed metal loop at the time the data storage device is manufactured) of the exposed metal loop. If a difference between the measured inductance and the reference inductance exceeds a threshold, the corrosion detection system may generate a notification and inform a host device of the corrosion risk.

Accordingly, examples of the present application describe a method that includes receiving an inductance measurement associated with an exposed metal loop provided on a surface of a PCB. The inductance measurement is compared to a reference inductance measurement associated with the exposed metal loop. A determination is may then be made regarding whether the difference between the inductance measurement and the reference inductance measurement exceeds a threshold. If it is determined that the difference between the inductance measurement and the reference inductance measurement exceeds the threshold, a notification is generated and provided to a host device.

In another example, a data storage device is described. In an example, the data storage device includes a controller and a corrosion detection system communicatively coupled to the controller. The corrosion detection system includes an induction measurement system that measures an inductance of an exposed metal loop located on a PCB of the data storage device. The inductance measurement system may also include a messaging system that generates a notification based, at least in part, on a determination that a difference between an inductance measurement and a reference inductance measurement exceeds a threshold.

In yet another example, the present application describes an electronic device that includes a controller means and a corrosion detection means communicatively coupled to the controller means. In an example, the corrosion detection means includes an induction measurement means that measures an inductance of an exposed metal loop located on a PCB of the electronic device. The inductance measurement means also compares the inductance of the exposed metal loop to a reference inductance measurement. The corrosion detection means may also include a messaging means that generates a notification based, at least in part, on a determination that a difference between the inductance measurement and the reference inductance measurement exceeds a threshold.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figures 1A, 1B:
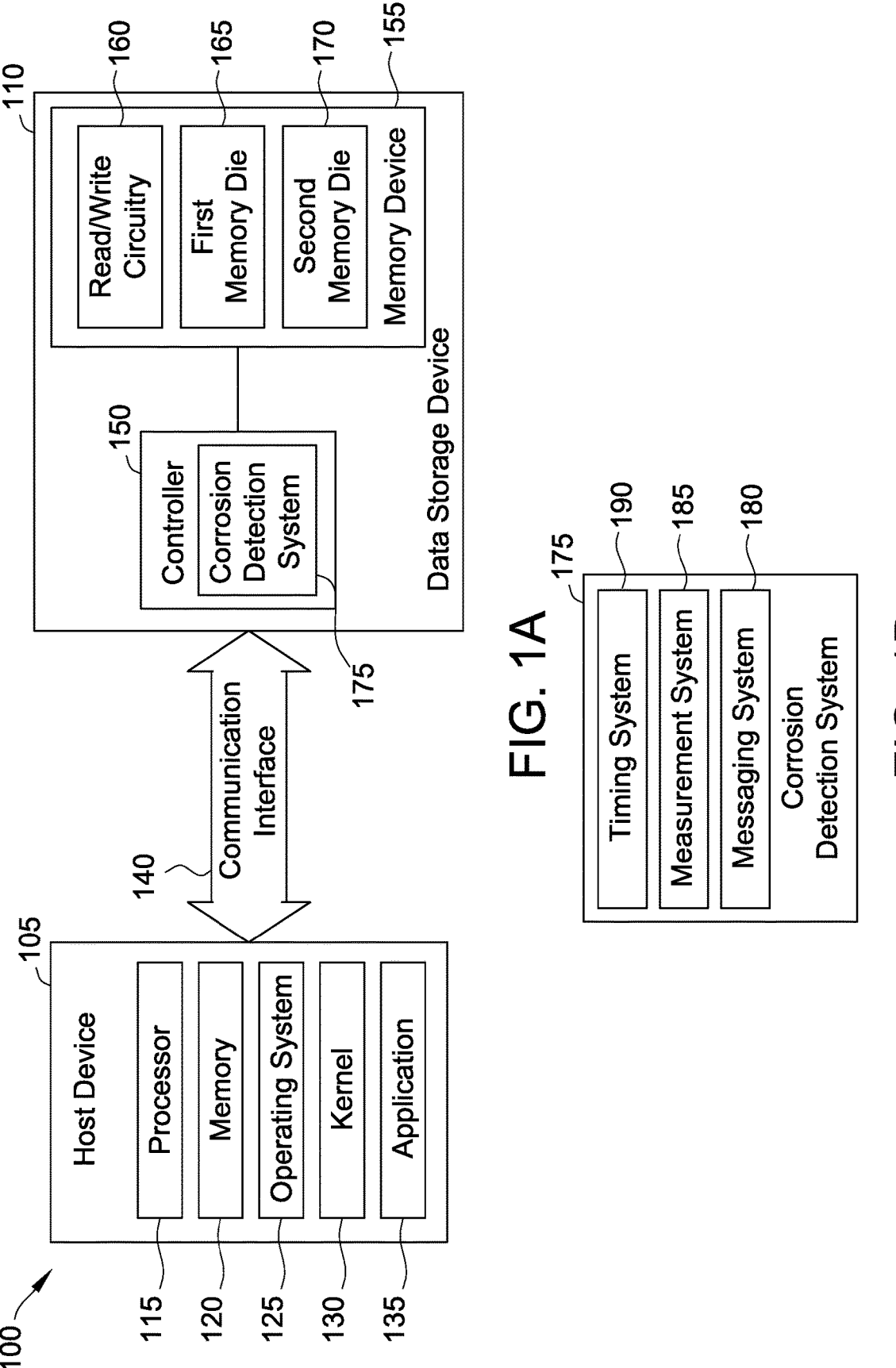
FIG. 1A is a block diagram of a system that includes a host device and a data storage device according to an example.
FIG. 1B illustrates a corrosion detection system that may be included as part of the data storage device of FIG. 1A according to an example.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems, or devices. Accordingly, examples may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Data storage devices (and other computing devices) typically include various computing components (e.g., NAND memory dies, controllers) mounted on a printed circuit board (PCB). The data storage device also includes various exposed copper connections (e.g., copper traces or copper wires) that are used to establish electrical connections between the PCB and/or the various computing components, route signals between the PCB and/or the various computing components and/or distribute power throughout the data storage device.

In some examples, data storage devices include mechanical enclosures or housings that surround the printed circuit board (PCB), the copper connections and the various computing components. However, due to the amount of heat generated by the various computing components, the mechanical enclosures typically include airflow inlets or vents that enable external air to enter the mechanical enclosure to cool the various computing components of the data storage device.

However, air contains moisture and other contaminants. Over time, the moisture and/or the contaminants in the air may negatively impact the components and/or the exposed copper connections of the data storage device. For example, the moisture in the air may cause the copper connections to corrode which may cause electrical discontinuities and/or shorts. Because the data storage device includes a mechanical enclosure, it may not be possible to visually inspect the data storage device for corrosion or otherwise determine whether the data storage device is exposed to a corrosion risk.

In order to address the above, the present application describes a corrosion detection system for a data storage device. The corrosion detection system includes an exposed metal loop provided on a surface of a PCB of the data storage device. In an example, the exposed metal loop is made from copper. Additionally, the exposed metal loop is provided on the PCB proximate an airflow inlet of a mechanical enclosure associated with the data storage device.

As will be explained in greater detail, the corrosion detection system periodically monitors or measures the inductance of the exposed metal loop and compares the measured inductance to a reference inductance or an initial inductance (e.g., the inductance of the exposed metal loop at the time the data storage device is manufactured) of the exposed metal loop. If the difference between the measured inductance and the reference inductance exceeds a threshold, the corrosion detection system may generate a notification and inform a host device that the data storage device is exposed to a corrosion risk.

Accordingly, many technical benefits may be realized including, but not limited to, enabling the early detection of corrosion exposure which may prevent failure of the data storage device and/or data loss, increasing the accuracy and ease of corrosion detection while eliminating the need for visual inspections, and enabling a host device to accurately identify and/or isolate data storage devices that are at risk for failure due to corrosion.

These and other examples are described in more detail with respect to FIG. 1A-FIG. 4.

FIG. 1A is a block diagram of a system 100 that includes a host device 105 and a data storage device 110 according to an example. In an example, the host device 105 includes a processor 115 and a memory 120 (e.g., main memory). The memory 120 may include or otherwise be associated with an operating system 125, a kernel 130 and/or an application 135.

The processor 115 can execute various instructions, such as, for example, instructions from the operating system 125 and/or the application 135. The processor 115 may include circuitry such as a microcontroller, a Digital Signal Processor (DSP), an Application-Specific Integrated Circuit (ASIC), a Field Programmable Gate Array (FPGA), hardwired logic, analog circuitry and/or various combinations thereof. In an example, the processor 115 may include a System on a Chip (SoC).

In an example, the memory 120 is used by the host device 105 to store data that is used, or otherwise executed by, the processor 115. Data stored in the memory 120 may include instructions provided by the data storage device 110 via a communication interface 140. By way of example, the data storage device 110 may be a data storage device internal to the host device 105 or a data storage device external to the host device 105. The data stored in the memory 120 may also include data that is used to execute instructions from the operating system 125 and/or one or more applications 135. The data stored in the memory 120 may be static and/or dynamic data associated with the operating system 125 and/or the one or more applications 135. The memory 120 may be a single memory or may include multiple memories, such as, for example one or more non-volatile memories, one or more volatile memories, or a combination thereof.

In an example, the operating system 125 may also include or otherwise be associated with a kernel 130. The kernel 130 may include instructions for managing various resources of the host device 105 (e.g., memory allocation), handling read and write requests, handling a garbage collection process, handling a corrosion detection process, and so on.

The communication interface 140 communicatively couples the host device 105 and the data storage device 110. The communication interface 140 may be a Serial Advanced Technology Attachment (SATA), a PCI express (PCIe) bus, a Small Computer System Interface (SCSI), a Serial Attached SCSI (SAS), Ethernet, Fiber Channel, or Wi-Fi. As such, the host device 105 and the data storage device 110 need not be physically co-located and may communicate over a network such as a Local Area Network (LAN) or a Wide Area Network (WAN), such as the internet. In addition, the host device 105 may interface with the data storage device 110 using a logical interface specification such as Non-Volatile Memory express (NVMe) or Advanced Host Controller Interface (AHCI).

The data storage device 110 may include a controller 150 and a memory device 155. In an example, the controller 150 is communicatively coupled to the memory device 155. In some examples, the memory device 155 includes one or more memory dies (e.g., first memory die 165 and second memory die 170). Although memory dies are specifically mentioned, the memory device 155 may include any non-volatile memory device, storage device, storage elements or storage medium including NAND flash memory cells and/or NOR flash memory cells.

The memory cells can take the form of solid-state (e.g., flash) memory cells and can be one-time programmable, few-time programmable, or many-time programmable. Additionally, the memory cells may be single-level cells (SLCs), multi-level cells (MLCs), triple-level cells (TLCs), quad-level cells (QLCs), penta-level cells (PLCs), and/or use any other memory technologies. The memory cells may be arranged in a two-dimensional configuration or a three-dimensional configuration.

In an example, the data storage device 110 may be attached to or embedded within the host device 105. In another example, the data storage device 110 may be implemented as an external device or a portable device that can be communicatively or selectively coupled to the host device 105. In yet another example, the data storage device 110 may be a component (e.g., a solid-state drive (SSD)) of a network accessible data storage system, a network-attached storage system, a cloud data storage system, and the like.

As previously described, the memory device 155 of the data storage device 110 may include a first memory die 165 and a second memory die 170. Although two memory dies are shown, the memory device 155 may include any number of memory dies (e.g., one memory die, two memory dies, eight memory dies, or another number of memory dies).

The memory device 155 may also include support circuitry. In an example, the support circuitry includes read/write circuitry 160. The read/write circuitry 160 supports the operation of the memory dies of the memory device 155. Although the read/write circuitry 160 is depicted as a single component, the read/write circuitry 160 may be divided into separate components, such as, for example, read circuitry and write circuitry. The read/write circuitry 160 may be external to the memory dies of the memory device 155. In another example, one or more of the memory dies may include corresponding read/write circuitry 160 that is operable to read data from and/or write data to storage elements within one individual memory die independent of other read and/or write operations on any of the other memory dies.

As previously described, the data storage device 110 may also include a controller 150. The controller 150 may be communicatively coupled to the memory device 155 via a bus, an interface or other communication circuitry. In an example, the communication circuitry may include one or more channels to enable the controller 150 to communicate with the first memory die 165 and/or the second memory die 170 of the memory device 155. In another example, the communication circuitry may include multiple distinct channels which enables the controller 150 to communicate with the first memory die 165 independently and/or in parallel with the second memory die 170 of the memory device 155.

The controller 150 may receive data and/or instructions from the host device 105. The controller 150 may also send data to the host device 105. For example, the controller 150 may send data to and/or receive data from the host device 105 via the communication interface 140. The controller 150 may also send data and/or commands to and/or receive data from the memory device 155.

The controller 150 may send data and a corresponding write command to the memory device 155 to cause the memory device 155 to store data at a specified address of the memory device 155. In an example, the write command specifies a physical address of a portion of the memory device 155.

The controller 150 may also send data and/or commands associated with one or more background scanning operations, corrosion detection operations, garbage collection operations, and/or wear leveling operations. The controller 150 may also send one or more read commands to the memory device 155. In an example, the read command specifies the physical address of a portion of the memory device 155 at which the data is stored.

In an example, the controller 150 may also include, or otherwise be associated with, a corrosion detection system

175. The corrosion detection system 175 may be communicatively coupled to an exposed metal loop (e.g., exposed metal loop 330 (FIG. 3A)) provided on a PCB, or otherwise associated with, the data storage device 110.

The corrosion detection system 175 periodically monitors or measures the inductance of the exposed metal loop. The corrosion detection system 175 may also compare the measured inductance of the exposed metal loop to a reference inductance or a calibration inductance (e.g., the inductance of the exposed metal loop at the time the data storage device 110 is manufactured) of the exposed metal loop. In one example, if the difference between the measured inductance and the reference inductance exceeds a threshold, the corrosion detection system 175 may provide a notification to the host device 105 that the data storage device 110 is at risk for, or is otherwise exposed to, corrosion. However, if the difference between the measured inductance and the reference inductance is below the threshold, the inductance of the exposed metal loop is measured at a later time.

In an example, the threshold difference between the reference inductance and the measured inductance is plus or minus at least ten percent. Although ten percent is specifically mentioned, other threshold values (e.g., above ten percent or below ten percent) may be used.

In another example, the corrosion detection system 175 may also detect whether the data storage device 110 is at risk for (or has experienced) an open or a short. For example, if the measured inductance of the exposed metal loop is zero, it may indicate the exposed metal loop has a short. In another example, if the inductance of the exposed metal loop is infinite, it may indicate that the exposed metal loop has broken or is otherwise open. In either case, the corrosion detection system 175 may provide a notification to the host device 105 that a short or an open has occurred.

In an example, the host 105 may include or otherwise be associated with a number of data storage devices 110. In one example, each data storage device 110 may include its own corrosion detection system 175. In another example, a single corrosion detection system 175 may monitor the inductance of multiple different data storage devices 110. In either case, the corrosion detection system 175 (or the notification provided by the corrosion detection system 175) may indicate which data storage device 110 is at risk for corrosion based, at least in part, on the comparison between the reference inductance and the measured inductance of the exposed metal loop.

In an example, the reference inductance of the exposed metal loop may be stored in the memory device 155. As previously indicated, the corrosion detection system 175 periodically measures the inductance of the exposed metal loop. The frequency of measurement may be programmed or otherwise hardcoded in the corrosion detection system 175 and/or the controller 150. For example, corrosion detection system 175 may be programmed to measure the inductance of the exposed metal loop every hour, every day, every week, every month or every year.

In another example, the frequency of measurement may be based on the age of the data storage device 110. For example, the frequency of measurement may be every month for the first couple of years of life of the data storage device 110 and increase in frequency as the data storage device 110 ages. In another example, each inductance measurement may be stored by the memory device 155. The corrosion detection system 175 may monitor or otherwise determine a trend associated with the measurements and increase (or decrease) a measurement frequency accordingly.

For example, if the measured inductance of the exposed metal loop indicates that the difference between the reference inductance and the measured inductance is approaching the threshold, the corrosion detection system 175 may increase the frequency of the measurements. In yet another example, the corrosion detection system 175 may determine, based at least in part, on analyzing the measurements and/or a trend/pattern of the measurements, that the difference between the reference inductance and the measured inductance will likely reach the threshold in a determined period. As such, the corrosion detection system may increase (or decrease) the frequency of measurements accordingly.

FIG. 1B illustrates the corrosion detection system 175 that may be included as part of the data storage device 110 of FIG. 1A according to an example. In an example, the corrosion detection system 175 includes a messaging system 180, a measurement system 185 and a timing system 190. Each of these systems may provide the functionality described above.

For example, the measurement system 185 may be used to measure the inductance of the exposed metal loop. The measurement system 185 may also be used to compare the measured inductance to the reference inductance of the exposed metal loop. In yet another example, the measurement system 185 may cause each inductance measurement to be stored by the memory device 155 (FIG. 1A), retrieve stored inductance measurements and/or analyze the inductance measurements to determine a trend and/or pattern of the data such as previously discussed.

In an example, the messaging system 180 may generate notifications regarding the comparison(s) between the measured inductance of the exposed metal loop and the reference inductance of the exposed metal loop. For example, if the difference between the reference inductance and the measured inductance reaches or exceeds the threshold, the messaging system 180 may generate a notification and provide the notification to the host device 105 (FIG. 1A). In another example, the messaging system 180 may generate a notification after each measurement and/or comparison and provide that information to the host device 105. In yet another example, the messaging system 180 may also provide notifications regarding any detected open or short such as previously described.

The timing system 190 may control or otherwise indicate when the inductance of the exposed metal loop should be measured. The timing system 190 may also control a frequency of the measurements. For example, if the measurement system 185 causes a first inductance measurement of the exposed metal loop to be taken, and a comparison between the first inductance measurement and the reference inductance measurement is the same or substantially similar (e.g., the difference between the first inductance measurement and the reference inductance measurement is not close to the difference threshold), the timing system 190 may determine that a subsequent inductance measurement should be taken one month later. Upon expiration of the determined time frame, the timing system 190 may indicate that a second inductance measurement of the exposed metal loop should be taken. This process may repeat any number of times and/or at an increased/decreased frequency based on the subsequent inductance measurements and comparisons.

Figure 2:
FIG. 2 illustrates a data storage device having a mechanical enclosure according to an example.

FIG. 2 illustrates a data storage device 200 having a mechanical enclosure 210 according to an example. In an example, the data storage device 200 may be similar to the data storage device 110 shown and described with respect to FIG. 1. Accordingly, the data storage device 200 may include a corrosion detection system (e.g., corrosion detection system 175 (FIG. 1A-FIG. 1B) such as previously described.

As shown, the data storage device 200 includes a mechanical enclosure 210 or a housing. The mechanical enclosure 210 may partially or completely enclose the various computing components of the data storage device 200 and/or an exposed metal loop (e.g., exposed metal loop 330 (FIG. 3A)).

In an example, the mechanical enclosure 210 includes one or more airflow inlets 220 or vents. Additionally, the one or more airflow inlets 220 may be provided at numerous locations/positions on the mechanical enclosure 210. In an example, the airflow inlets 220 enable external air to enter the mechanical enclosure 210 and cool the various computing components of the data storage device 200.

Because the exposed metal loop is positioned proximate or adjacent to the airflow inlets 220, the exposed meal loop will be exposed to any and all air that enters the airflow inlets 220. As such, the exposed metal loop may also be subjected to any moisture or other contaminants that are contained in the air. Thus, if there is a risk of corrosion, the inductance measurements of the exposed metal loop may provide an early indication of the risk.

Figure 3A:
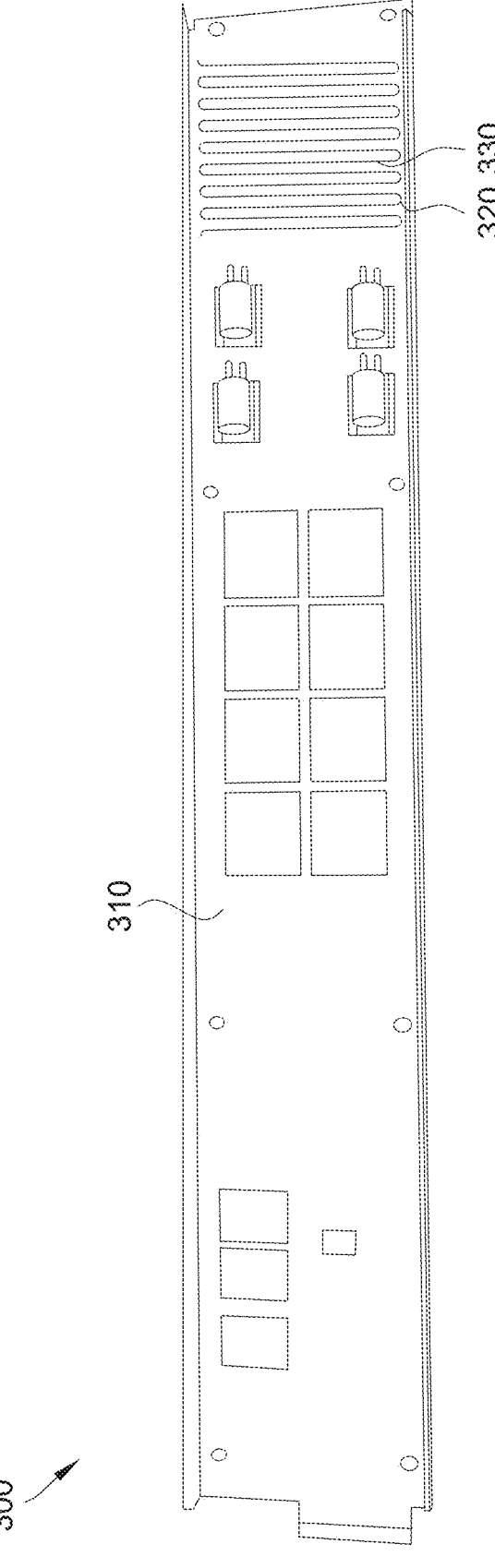
FIG. 3A illustrates an exposed metal loop provided on a first surface of a printed circuit board of a data storage device according to an example.

FIG. 3A illustrates an exposed metal loop 330 provided on a first surface of a printed circuit board 310 of a data storage device 300 according to an example. In an example, the data storage device 300 is similar to the data storage device 200 shown and described with respect to FIG. 2 and/or to the data storage device 110 shown and described with respect to FIG. 1A.

However, in FIG. 3A, the mechanical enclosure 210 has been removed.

The exposed metal loop 330 is provided on a distal end of the PCB 310 of the data storage device. Although a distal end is mentioned, the exposed metal loop 330 may be provided at any location/position on the PCB 310. Additionally, although a single exposed metal loop 330 is shown, the data storage device 300 may include multiple different exposed metal loops 330 provided at various locations on the PCB 310.

In an example, the exposed metal loop 330 is provided on the PCB 310 such that it is proximate or adjacent to one or more airflow inlets (e.g., airflow inlet 220 (FIG. 2)) of the mechanical enclosure. As such, the exposed metal loop 330 may be subjected to the air, and any moisture/contaminants in the air, as it enters the mechanical enclosure via the airflow inlet.

In an example, the exposed metal loop 330 is formed from copper. Although copper is specifically mentioned, other materials, or combination of materials, may be used. The exposed metal loop 330 may be formed on and/or embedded in the PCB 310. As such, additional insulation materials or coatings are not required on the exposed metal loop 330. In an example, the exposed metal loop 330 is a copper trace that is etched in, or otherwise formed on the PCB 310. In another example, the exposed metal loop 330 is a copper wire that is embedded on the PCB 310.

In an example, the exposed metal loop 330 is formed in a looping shape or a zigzag pattern. For example, the exposed metal loop 330 includes a plurality of loops or windings 320. In an example, and in order for an accurate inductance measurement to be taken, the exposed metal loop 330 includes at least four windings 320 or loops. Although a looping shape is shown and described, other shapes may be used.

Figure 3B:
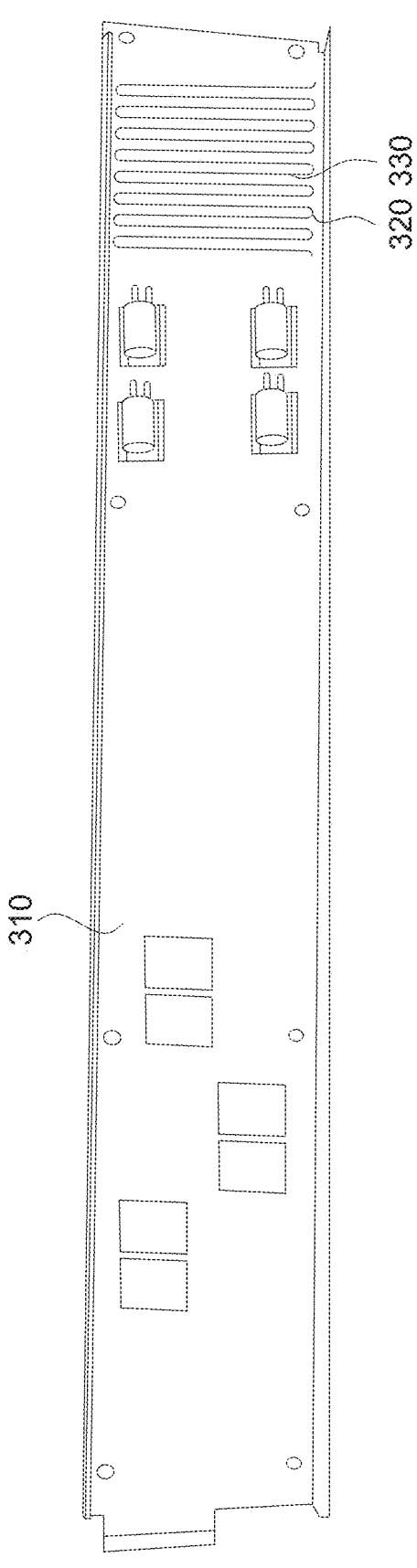
FIG. 3B illustrates an exposed metal loop provided on a second surface of a printed circuit board of a data storage device according to an example.

The exposed metal loop 320 is provided on a first surface (e.g., a top surface) of the PCB 310. However, one or more additional exposed metal loops 330 may be provided on a second surface (e.g., a bottom surface) of the PCB 310 such as shown in FIG. 3B. In another example, a first portion of the exposed metal loop 330 may be provided on a first surface of the PCB 310 and a second portion of the exposed metal loop 330 may be provided on a second surface of the PCB 310. For example, the exposed metal loop 330 may wrap around the PCB 310 from the first surface to the second surface.

Figure 4:
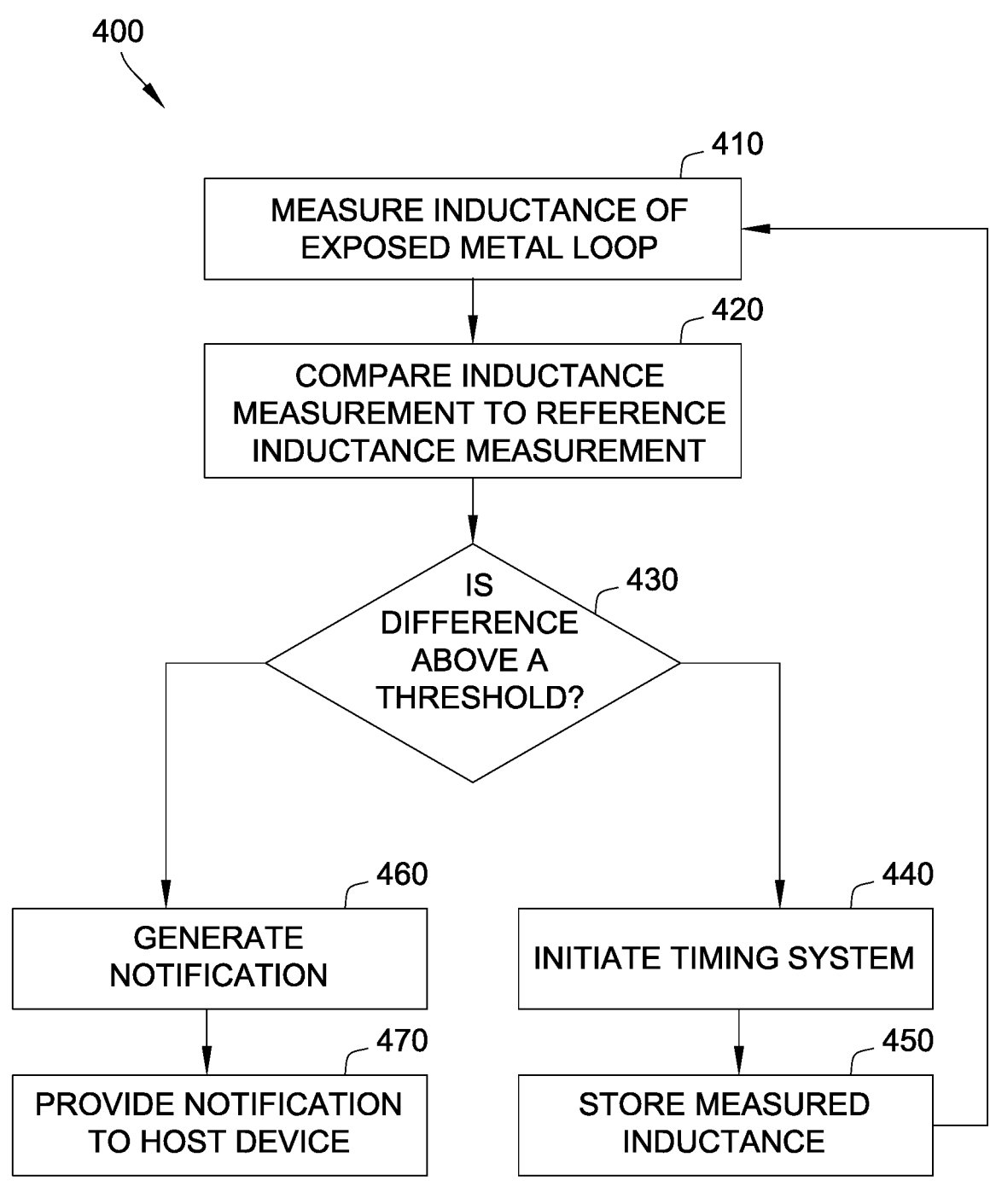
FIG. 4 illustrates a method for detecting corrosion in a data storage device according to an example.

FIG. 4 illustrates a method 400 for detecting corrosion in a data storage device according to an example. In an example, the method 400 may be performed by a data storage device such as, for example, the data storage device 110 shown and described with respect to FIG. 1A. In another example, the method 400 may be performed by a corrosion detection system such as, for example, the corrosion detection system 175 shown and described with respect to FIG. 1A-FIG. 1B.

The method 400 begins when an inductance of an exposed metal loop is measured (410). In an example, the exposed metal loop is a copper loop provided on at least one surface of a PCB of a data storage device or other computing device. In an example, the exposed metal loop is embedded at a distal end of the PCB adjacent or proximate to an airflow inlet provided on a mechanical enclosure of the data storage device or computing device.

The measured inductance may then be compared (420) to a reference inductance measurement associated with the exposed metal loop. In an example, the reference inductance measurement is taken when the data storage device is manufactured and/or when the exposed metal loop is embedded in the PCB.

A determination (430) is made as to whether a difference between the reference inductance measurement and the measured inductance is above a threshold. If it is determined that the difference between the reference inductance measurement and the measured inductance does not exceed (or is below) the threshold, the timing system is initiated (440). In an example, initiating the timing system includes determining when a subsequent inductance measurement of the exposed metal loop will be taken. Additionally, the measured inductance may be stored.

However, it is determined (430) that the difference between the reference inductance measurement and the measured inductance exceeds the threshold, a notification is generated (460) and provided (470) to the host device. In an example, the notification may include the measured inductance, information regarding the difference between the measured inductance and the reference inductance, whether the measurement indicates an open or a short, information regarding the location of the data storage device and the like. In an example, the inductance measurement system and/or the controller may also initiate one or more data storage operations (e.g., data transfer operations to move data from the data storage device on which corrosion was detected, to another data storage device) based, at least in part, on a determination that the difference between the reference inductance measurement and the measured inductance exceeds the threshold.

As explained herein, examples of the present disclosure describe a method, comprising: receiving an inductance measurement associated with an exposed metal loop provided on a surface of a printed circuit board (PCB); comparing the inductance measurement to a reference inductance measurement associated with the exposed metal loop;

determining whether the difference between the inductance measurement and the reference inductance measurement exceeds a threshold; based, at least in part, on determining the difference between the inductance measurement and the reference inductance measurement exceeds the threshold, generating a notification; and providing the notification to a host device. In an example, the method also includes receiving a subsequent inductance measurement after a period of time has passed. In an example, the period of time is based, at least in part, on a determination that the difference between the inductance measurement and the reference inductance measurement is below the threshold. In an example, the exposed metal loop is formed from copper. In an example, the exposed metal loop includes at least four windings. In an example, a first portion of the exposed metal loop is provided on a first surface of the PCB and a second portion of the exposed metal loop is provided on a second surface of the PCB. In an example, the exposed metal loop is positioned on the PCB to be proximate to an air inlet of a mechanical enclosure encasing the PCB. In an example, the threshold difference between the inductance measurement and the reference inductance measurement is at least ten percent.

Examples also describe a data storage device, comprising: a controller; and a corrosion detection system communicatively coupled to the controller and comprising: an induction measurement system that measures an inductance of an exposed metal loop provided on a printed circuit board (PCB) of the data storage device; and a messaging system that generates a notification based, at least in part, on a determination that a difference between an inductance measurement and a reference measurement exceeds a threshold. In an example, the data storage device also includes a timing system that determines when the inductance of the exposed metal loop is measured. In an example, the exposed metal loop is formed from copper. In an example, the exposed metal loop includes at least four windings. In an example, a first portion of the exposed metal loop is located on a top surface of the PCB and a second portion of the exposed metal loop is located on a bottom surface of the PCB opposite the top surface. In an example, the threshold difference between the inductance measurement and the reference inductance measurement is at least ten percent.

The present disclosure also describes an electronic device, comprising: a controller means; and a corrosion detection means communicatively coupled to the controller means and comprising: an induction measurement means that: measures an inductance of an exposed metal loop located on a printed circuit board (PCB) of the electronic device; and compares the inductance of the exposed metal loop to a reference inductance measurement; and a messaging means that generates a notification based, at least in part, on a determination that a difference between the inductance measurement and the reference inductance measurement exceeds a threshold. In an example, the electronic device also includes a timing means that determines when the inductance of the exposed metal loop is taken. In an example, the exposed metal loop is formed from copper. In an example, a first portion of the exposed metal loop is located on a top surface of the PCB and a second portion of the exposed metal loop is located on a bottom surface of the PCB opposite the top surface. In an example, the exposed metal loop is positioned on the PCB to be proximate to an airflow inlet of a mechanical enclosure associated with the electronic device. In an example, the threshold difference between the inductance measurement and the reference inductance measurement at least ten percent.

One of ordinary skill in the art will recognize that the technology described herein is not limited to a single specific memory structure, but covers many relevant memory structures within the spirit and scope of the technology as described herein and as understood by one of ordinary skill in the art.

The term computer-readable media as used herein may include computer storage media. Computer storage media may include volatile and nonvolatile, removable, and non-removable media implemented in any method or technology for storage of information, such as computer readable instructions, data structures, or program modules. Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information, and which can be accessed by a computing device (e.g., host device 105 (FIG. 1)). Any such computer storage media may be part of the computing device. Computer storage media does not include a carrier wave or other propagated or modulated data signal.

Additionally, examples described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various examples.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The description and illustration of one or more aspects provided in the present disclosure are not intended to limit or restrict the scope of the disclosure in any way. The aspects, examples, and details provided in this disclosure are considered sufficient to convey possession and enable others to make and use the best mode of claimed disclosure.

The claimed disclosure should not be construed as being limited to any aspect, example, or detail provided in this disclosure. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

Aspects of the present disclosure have been described above with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

References to an element herein using a designation such as "first," "second," and so forth does not generally limit the quantity or order of those elements. Rather, these designations may be used as a method of distinguishing between two or more elements or instances of an element. Thus, reference to first and second elements does not mean that only two elements may be used or that the first element precedes the second element. Additionally, unless otherwise stated, a set of elements may include one or more elements.

Terminology in the form of "at least one of A, B, or C" or "A, B, C, or any combination thereof" used in the description or the claims means "A or B or C or any combination of these elements." For example, this terminology may include A, or B, or C, or A and B, or A and C, or A and B and C, or 2A, or 2B, or 2C, or 2A and B, and so on. As an additional example, "at least one of: A, B, or C" is intended to cover A, B, C, A-B, A-C, B-C, and A-B-C, as well as multiples of the same members. Likewise, "at least one of: A, B, and C" is intended to cover A, B, C, A-B, A-C, B-C, and A-B-C, as well as multiples of the same members.

Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

What is claimed is:

1. A method, comprising:

receiving an inductance measurement associated with an exposed metal loop provided on a surface of a printed circuit board (PCB), wherein a first portion of the exposed metal loop is provided on a first surface of the PCB and a second portion of the exposed metal loop is provided on a second surface of the PCB;

comparing the inductance measurement to a reference inductance measurement associated with the exposed metal loop;

determining whether the difference between the inductance measurement and the reference inductance measurement exceeds a threshold;

based, at least in part, on determining the difference between the inductance measurement and the reference inductance measurement is below the threshold, determining a frequency at which one or more subsequent inductance measurements is to be performed; and based, at least in part, on determining the difference between the inductance measurement and the reference inductance measurement exceeds the threshold:

generating a notification; and providing the notification to a host device.

2. The method of claim 1, further comprising receiving the at least one or more subsequent inductance measurements after a period of time associated with the frequency has passed.

3. The method of claim 2, wherein the period of time is based, at least in part, on an amount at which the difference between the inductance measurement and the reference inductance measurement is below the threshold.

4. The method of claim 1, wherein the exposed metal loop is formed from copper.

5. The method of claim 1, wherein the exposed metal loop includes at least four windings.

6. The method of claim 1, wherein at least one of the first portion of the exposed metal loop and the second portion of the exposed metal loop is positioned on the PCB to be proximate to an air inlet of a mechanical enclosure encasing the PCB.

7. The method of claim 1, wherein the threshold difference between the inductance measurement and the reference inductance measurement is at least ten percent.

8. The method of claim 1, wherein the notification provides information about at least one of a cause of the threshold being exceeded and a location at which the inductance measurement was taken.

9. The method of claim 1, wherein the frequency is based, at least in part, on one or more characteristics of the data storage device.

10. A data storage device, comprising:
a controller; and
a corrosion detection system communicatively coupled to the controller and comprising:
an induction measurement system that measures an inductance of an exposed metal loop provided on a printed circuit board (PCB) of the data storage device, wherein a first portion of the exposed metal loop is located on a top surface of the PCB and a second portion of the exposed metal loop is located on a bottom surface of the PCB opposite the top surface;
a messaging system that generates a notification based, at least in part, on a determination that a difference between an inductance measurement and a reference measurement exceeds a threshold; and
a timing system that determines a frequency at which one or more subsequent inductance measurements is to be performed in response to a determination that the difference between the inductance measurement and the reference measurement is below the threshold.

11. The data storage device of claim 10, wherein the exposed metal loop is formed from copper.

12. The data storage device of claim 10, wherein the exposed metal loop includes at least four windings.

13. The data storage device of claim 10, wherein the threshold difference between the inductance measurement and the reference inductance measurement is at least ten percent.

14. The data storage device of claim 10, wherein the notification provides information about at least one of a cause of the threshold being exceeded and a location at which the inductance measurement was taken.

15. The data storage device of claim 10, wherein the induction measurement system performs the at least one or more subsequent inductance measurements after a period of time associated with the frequency has passed.

16. An electronic device, comprising:
a controller means; and
a corrosion detection means communicatively coupled to the controller means and comprising:
an induction measurement means that:
measures an inductance of an exposed metal loop located on a printed circuit board (PCB) of the electronic device, wherein a first portion of the exposed metal loop is located on a top surface of the PCB and a second portion of the exposed metal loop is located on a bottom surface of the PCB; and
compares the inductance of the exposed metal loop to a reference inductance measurement;
a messaging means that generates a notification based, at least in part, on a determination that a difference between the inductance measurement and the reference inductance measurement exceeds a threshold; and
a timing means that determines a frequency at which one or more subsequent inductance measurements is to be performed in response to a determination that the difference between the inductance measurement and the reference measurement is below the threshold.

17. The electronic device of claim 16, wherein the exposed metal loop is formed from copper.

18. The electronic device of claim 16, wherein at least one of the first portion of the exposed metal loop and the second portion of the exposed metal loop is positioned on the PCB to be proximate to an airflow inlet of a mechanical enclosure associated with the electronic device.

19. The electronic device of claim 16, wherein the threshold difference between the inductance measurement and the reference inductance measurement is at least ten percent.

20. The electronic device of claim 16, wherein the notification provides information about at least one of a cause of the threshold being exceeded and a location at which the inductance measurement was taken.

* * * * *